United States Patent [19]
Scudder

[11] 3,860,900
[45] Jan. 14, 1975

[54] METHOD OF MONITORING THE POSITION OF TOWED UNDERWATER APPARATUS

[75] Inventor: Ronald J. Scudder, Winston-Salem, N.C.

[73] Assignee: Western Electric Company, Incorporated, New York, N.Y.

[22] Filed: Feb. 21, 1973

[21] Appl. No.: 334,320

[52] U.S. Cl.................. 340/3 R, 340/3 E, 340/3 T
[51] Int. Cl........................... G01s 9/68, G01s 5/18
[58] Field of Search ........ 340/2, 3 R, 3 T, 3 E, 5 R, 340/6 R

[56] References Cited
UNITED STATES PATENTS
3,421,138  1/1969  Moulin et al........................ 340/5 R
3,731,263  5/1973  Daniels et al. ..................... 340/3 R

*Primary Examiner*—Richard A. Farley
*Attorney, Agent, or Firm*—W. L. Williamson

[57] ABSTRACT

The three-dimensional position (geographic position and depth) of equipment towed underwater by a moving ship is continually and precisely monitored by an acoustic system that includes a network of underwater, acoustic transponders, and a remote, battery-powered, acoustic interrogation transducer that is associated with the suspended equipment. Initially a combination of satellite fixes of the ship's position and direct interrogation of the transponders from the ship are utilized by a shipboard computer system to determine the three-dimensional position of the transponders. Then, as the ship moves about above the transponder network towing the equipment, the transponders are periodically interrogated from the ship. The resulting acoustic travel with the previously calculated positions of the transponders to continually compute and predict the geographic position of the ship. The remote interrogation transducer is also periodically command interrogated from the ship and thereby actuated both to respond to the ship and to interrogate the transponders, which respond to the ship. The resulting acoustic travel times, the positions of the transponders, and the predicted positions of the ship are utilized by the computer system to monitor the three-dimensional position of the remote interrogation transducer and the towed equipment.

4 Claims, 8 Drawing Figures

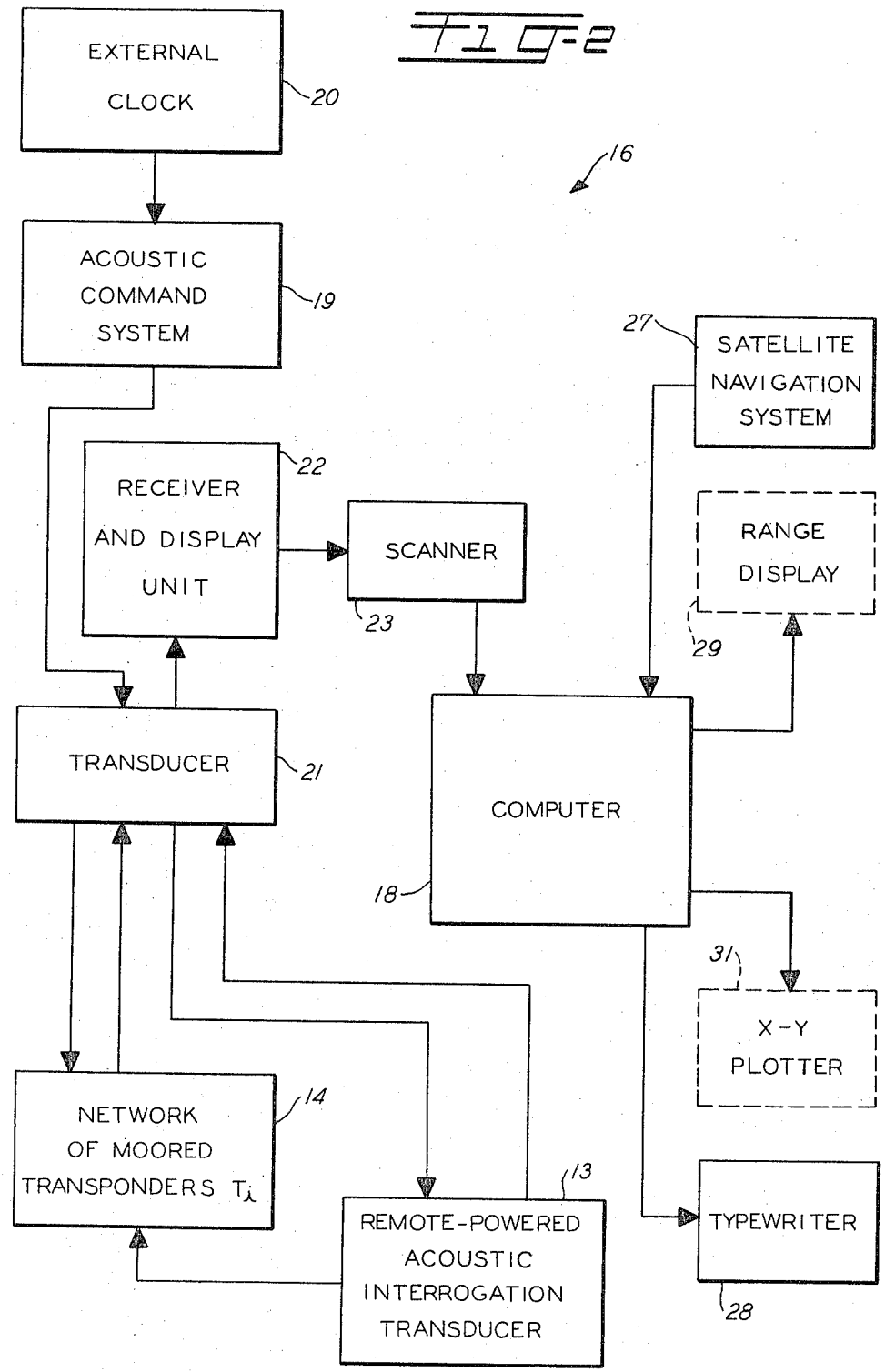

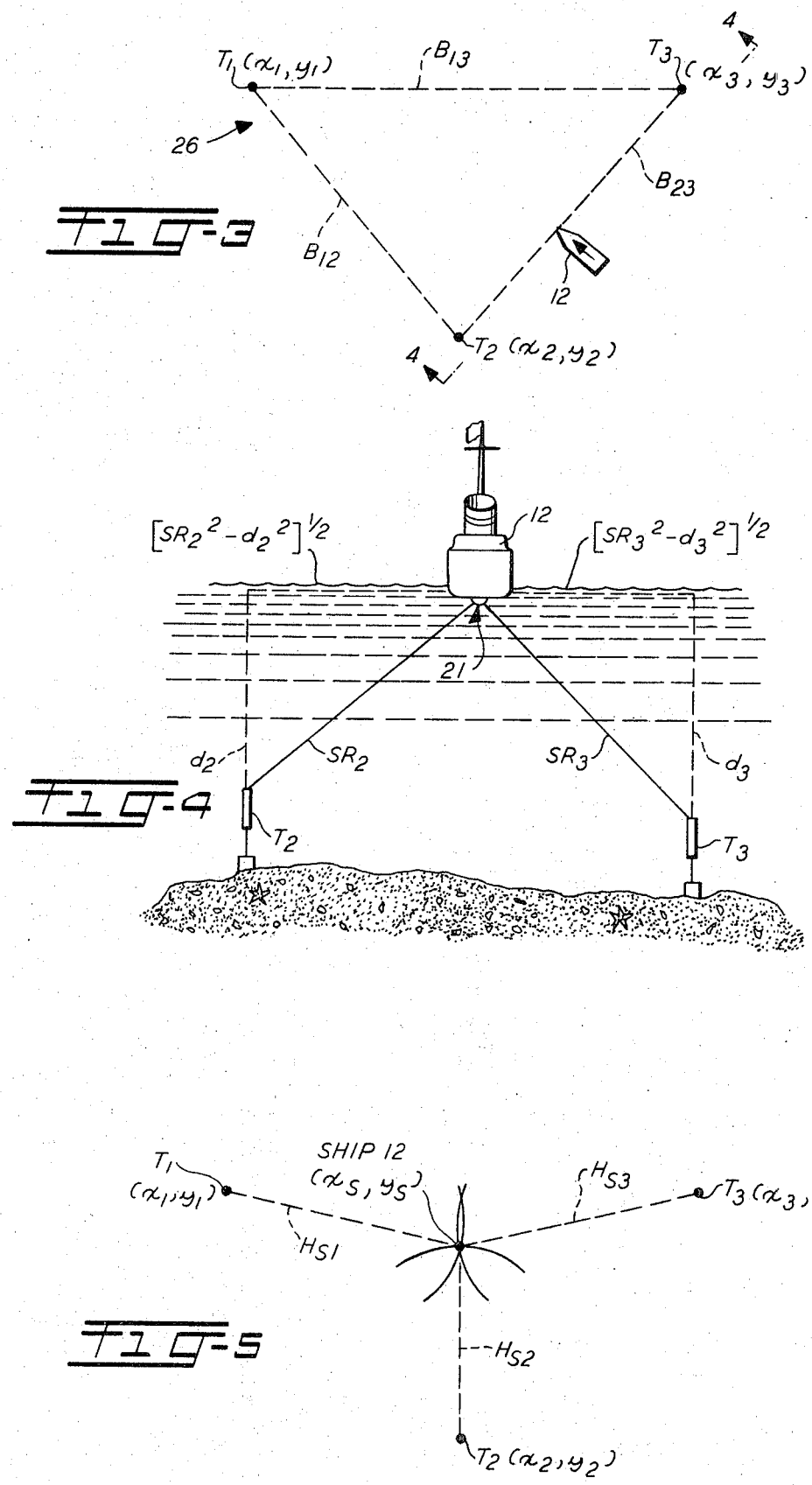

METHOD OF MONITORING THE POSITION OF TOWED UNDERWATER APPARATUS

GOVERNMENT CONTRACT

The invention herein claimed was made in the course of, or under contract with the United States Navy.

BACKGROUND OF THE INVENTION

1. Field of the Invention

This invention relates to methods of monitoring the position of submerged objects. More particularly, the invention relates to methods of employing acoustic interrogation to precisely and continually monitor the geographic position and depth of moveable underwater equipment. The invention herein claimed was made in the course of, or under contract with the Department of the Navy.

2. Description of the Prior Art

Various commerical, scientific, and military operations require the precise locating and/or guidance of submerged equipment. Examples of such operations include the installation of underwater pertroleum equipment, exploration for sea floor minerals, and the laying of cables and pipelines. Various methods that employ acoustic or combined acoustic-electromagnetic systems are available for use in such operations.

One such method is available for horizontally aligning an object suspended from an ocean platform relative to an installation on the ocean floor. The object mounts an acoustic source that is interrogated from the platform to respond to the platform and also to reinterrogate a transponder associated with the installation. The time differences between the responses received by the platform from the transponder and from the acoustic source are used to indicate any horizontal displacement between the object and the installation. This method is limited to determining the horizontal position of a suspended object relative to a fixed point, i.e., the installation, while the object is stationary and does not include monitoring the three-dimensional position of a moving object.

A combined acoustic-electromagnetic system has been used to fix the geographic position of a ship relative to that of a network of bottom-mounted hydrophones. The ship broadcasts acoustic signals to the hydrophones which, in turn, activate attached radio buoys for broadcasting electromagntic responses to the ship. The time intervals between the initiation of interrogation by the ship and the reception of responses at the ship are then employed to determine the geographical position of the ship relative to a system of axes associated with the hydrophones.

There are also available acoustic systems for determining the geographic position of a towed body relative to underwater transponders of known geographic location. In an example of such a system, the towed body carries an acoustic device that interrogates the transponders, thereby supplying the requisite pulse information to a range computer for use in determining the geographic position of the body. Such a system is of two-dimensional capability only and is used, e.g., to chart or to navigate waterways.

It may be thus appreciated that there is a need for a method of precisely and continually monitoring the three-dimensional position of equipment towed underwater from a moving ship.

SUMMARY OF THE INVENTION

The invention contemplates a method of utilizing acoustic interrogation-derived distances to precisely and continually monitor the three-dimensional position of equipment that is towed underwater by a ship within the approximate geographic area bounded by a network of underwater transponders, the method comprising the steps of: (1) fixing the three-dimensional positions of the transponders; (2) periodically fixing the geographic position of the vessel relative to the transponders by interrogating the transponders directly from the ship; and (3) periodically fixing the three-dimensional position, relative to the ship and the transponders, of a remote interrogation transducer that is physically proximate to the towed equipment by command interrogating the remote interrogation transducer, which then interrogates the transponders.

DESCRIPTION OF THE DRAWINGS

FIG. 2 is a block diagram illustrating the functional arrangement of acoustic locating apparatus which may be employed in practicing the invention;

FIG. 3 is a schematic representation of a reference transponder network used in fixing the positions of individual transponders;

FIG. 4 is a sectional view, taken along the line 4—4 in FIG. 3 in the direction of the arrows, schematically illustrating the acoustic interrogation-derived distances that are used in computing baseline lengths between transponders;

FIG. 5 is a graphical representation of a method of determining the geographic position of a ship that tows the underwater equipment;

DETAILED DESCRIPTION

Figure 1:
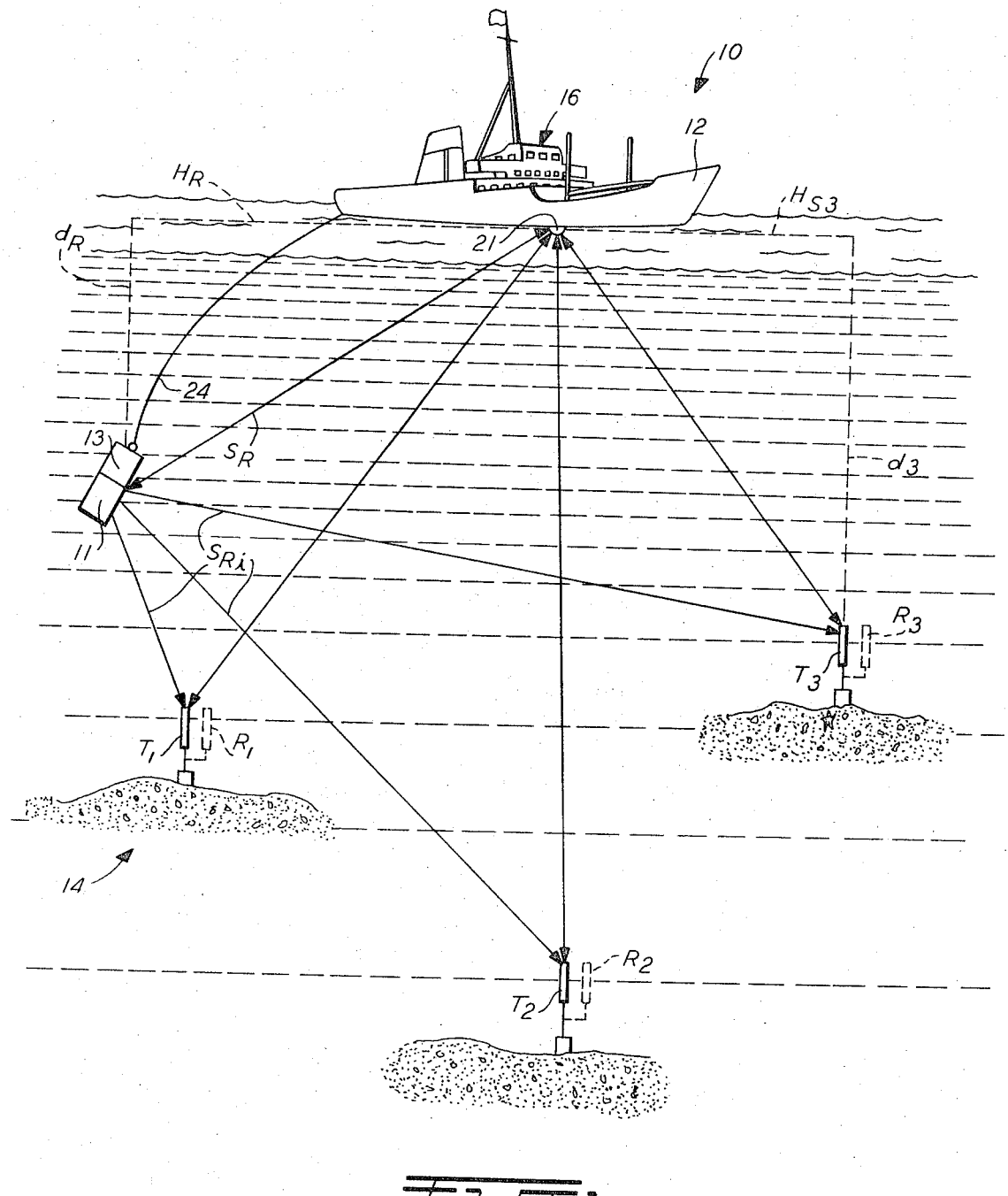
FIG. 1 is an isometric view in schematic form of acoustic locating apparatus suitable for monitoring the three-dimensional position of towed underwater equipment according to the method of the present invention.

Referring first to FIG. 1, there is shown a schematic representation of an acoustic locating system, designated generally by the reference numeral 10, that may be used in accordance with the method of the present invention to continually and precisely monitor the three-dimensional position of equipment 11 that is towed underwater by a ship 12.

The acoustic locating system 10 includes a remote, battery-powered, acoustic interrogation transducer 13 (hereafter termed the RIT) suspended from the ship 12 in physical proximity to the towed equipment 11, a network 14 of acoustic transponders $T_i$, e.g., $T_1$, $T_2$, and $T_3$, fixedly moored underwater, typically on an ocean floor, and also shipboard locating equipment 16 (see also FIG. 2). The functions of the shipboard locating equipment 16 include interrogating the transponders $T_i$ directly from the ship 12; command interrogating the RIT 13 to remote interrogate the transponders; and determining the acoustic travel times associated with interrogation, that is, the time intervals between the initiation of acoustic interrogation and the reception at the ship of the acoustic responses from the RIT and the transponders. The shipboard locating system 16 includes a computer 18 that utilizes the acoustic travel times to continually compute the position of the ship 12 and the towed equipment 11.

Referring to FIG. 2, the shipboard locating equipment 16 includes an acoustic command system 19 that utilizes the timing provided by an external clock 20 for periodically actuating a hull-mounted or a towed transducer 21 to transmit acoustic interrogation signals at frequency A directly to the transponders $T_i$. The transponders $T_1$, $T_2$, and $T_3$ respond to the interrogation at frequency A by transmitting signals to the transducer 21 at frequencies C, D, and E, respectively. The acoustic command system 19 may also be used to periodically command interrogate the RIT 13 at frequency B (which doesn't interrogate the transponders $T_i$), causing the RIT both to interrogate the transponders at frequency A and also to transmit a response to the transducer 21 at frequency A. The transponders $T_1$, $T_2$, and $T_3$ then respond to the interrogation signals from the RIT 13 by transmitting signals to the transducer 21 at frequencies C, D, and E, respectively.

In summary, when the acoustic command system 19 actuates the transducer 21 for transmitting signals at frequency A to interrogate the transponders $T_i$, the transponders transmit response signals to the transducer; and, when the transducer transmits signals at frequency B to command interrogate the RIT 13, both the RIT and the transponders transmit response signals to the transducer. Those skilled in the art will appreciate that the interrogation frequencies A and B may be replaced by two uniquely coded signal bursts of the same frequency, i.e., codes A and B.

The shipboard locating equipment 16 also includes a receiver and display unit 22 that receives composite, amplified acoustic response signals from the transducer 21 and separates the composite signals into discrete frequencies that are unique to the RIT 13 and to each of the transponders $T_i$. The receiver unit 22 measures and visually displays the associated acoustic travel times, that is, the elapsed times between the initiation of the interrogation signals and the reception of the acoustic responses, and stores the travel times. A scanner 23 then transfers the travel time information to the computer 18 for use thereby in computing distances represented by the travel times.

The method of the present invention comprises the steps of: (1) determining the three-dimensional positions of the moored transponders $T_i$; (2) periodically fixing the geographic position of the ship 12 relative to the transponders by interrogating the transponders directly from the ship; and (3) periodically fixing the three-dimensional position of the RIT 13 and the towed equipment 11 relative to the ship and the transponders by remote interrogating the transponders from the RIT.

Referring again to FIG. 1, prior to the use of the acoustic locating system 10 to monitor the position of the towed equipment 11, the network 14 of moored transponders $T_i$ is established. For purposes of illustration, the network 14 is assumed to comprise three transponders $T_i$ (i = 1, 2, 3), the minimum number required to accurately monitor the position of the ship 12 and the towed equipment 11. To further ensure accuracy, the network 14 preferably encompasses the approximate geographic area within which the particular underwater operation is carried out. Examples of the underwater operation include lowering the towed equipment 11 by a rope, line, or cable 24 (an electrical cable is unnecessary because the RIT 13 utilizes a self-contained battery for power) from the moving ship 12 to a designated bottom site, or traversing a given path with the equipment suspended at a particular depth. The position of the towed equipment 11 may then be monitored throughout this operation according to the above-described method.

Step one, fixing the three-dimensional positions of the transponders $T_i$, comprises (a) establishing a reference transponder network from the approximate geographic positions of the transponders $T_i$; (b) fixing the depth of each transponder; (c) determining baseline lengths (actual horizontal distances), $B_{ij}$, between the transponders; and (d) adjusting the geographic configuration of the reference transponder network. As used here, geographic configuration means the spatial separation between the transponders $T_i$, the geographic locations of the transponders and the orientation of the baselines $B_{ij}$ relative to true north.

Referring now to FIG. 3, navigational aids such as the LORAN A or C or the OMEGA system may be used to fix the approximate geographic coordinates $(x_i, y_i)$ of the transponders $T_i$ by fixing the approximate position of the ship 12 as the transponders are lowered therefrom to their mounting sites. The approximate geographic coordinates establish the locus of points of a reference transponder network 26 and are stored in the computer 18 (FIG. 2) for use in fixing the precise geographic configuration of the transponder network 14.

Referring generally to FIG. 1, the depth, $d_i$, of any one of the transponders $T_i$ may be ascertained by maneuvering the ship 12 in a cloverleaf pattern above the transponder mounting site and interrogating the transponder directly from the ship until the receiver 22 indicates a minimum round trip acoustic travel time. This minimum acoustic travel time corresponds to the closest point of approach to the transponder $T_i$ and indicates that the ship is directly above the transponder. Accordingly, the depth $d_i$ of the transponder $T_i$ may be computed by multiplying the average vertical velocity of sound in the water column (i.e., surface to bottom) by one-half the minimum round trip acoustic travel time.

Referring again to FIG. 3, by using the approximate geographic coordinates $(x_i, y_i)$ of the transponders $T_i$ as reference points, each baseline length $B_{ij}$ (ij = 12, 13, 23) may be obtained from transponder interrogations taken while the ship 12 crosses each baseline at its approximate midpoint and at a right angle. By crossing each baseline $B_{ij}$ at a slow speed and repeatedly interrogating the two baseline endpoint transponders directly from the ship 12, a minimum round trip acoustic travel time is obtained for each endpoint transponder. Referring now to FIG. 4, the slant range (actual distance) between the ship 12 and either endpoint transponder $T_i$ is given by:

$SR_i = v_i \times t_i /2$, where $v_i$ represents the velocity of sound in water, and $t_i$ is the minimum round trip acoustic travel time for the interrogation taken at the point at which the baseline $B_{ij}$ is crossed.

Using the slant range $SR_i$ and the previously calculated depths, $d_i$, of the transponders $T_i$, the computer 18 (FIG. 2) applies the PYthagorean theorem to obtain the horizontal distance between the ship 12 and each endpoint transponder. The baseline $B_{ij}$ is then obtained by adding the horizontal distances between the ship 12 and the two endpoint transponders. As an example, and referring to FIG. 4, for transponders $T_2$ and $T_3$, the baseline length $B_{23}$ is given by:

$$B_{23} = [SR_2^2 - d_2^2] + [SR_3^2 - d_3^2] \cdot$$

Referring again to FIG. 3, because the reference transponder network 26 is established from the approximate geographic positions of the transponders $T_i$, its geographic configuration may be inaccurate. However, the calculated baseline lengths $B_{ij}$ are quite accurate and may be used in conjunction with satellite fixes, obtained using a satellite navigation system 27 (FIG. 2), to correct any error in the geographic configuration.

The first step in correcting the geographic configuration of the reference network 26 is to repeatedly fix the position of the ship 12 as it steams about both within, and adjacent to the outer limits of, the reference network. A number of fixes of the position of the ship 12 may be obtained during this maneuvering using the satellite navigation system 27 (FIG. 2) to process signals from the Navy Navigation Satellite System. The satellite-derived fix information is then stored in the computer 18 (FIG. 2).

Referring now to FIG. 1, simultaneously with the obtaining of each satellite fix the transducer 21 transmits an interrogation pulse to the transponders $T_i$ to actuate the transponders for replying to the ship. The computer 18 (FIG. 2) uses the resulting acoustic travel times to determine slant ranges between the ship 12 and the transponders $T_i$. Then, and as described previously for the determination of the baseline lengths $B_{ij}$, the computer 18 uses these slant ranges and the depths $d_i$ of the transponders $T_i$ to calculate the horizontal distances between the ship 12 and the transponders at the time of each satellite-derived fix. This horizontal distance information represents the radii of arcs having their centers of curvature at the satellite-derived fixes of the position of the ship 12. The computer 18 obtains the precise geographic coordinates of each of the transponders $T_i$ by solving for the intersection of the horizontal distance arcs associated with each transponder. The computer then translates the baselines $B_{ij}$ to the geographic positions of the transponders $T_i$, obtaining a statistical best fit for these positions while keeping the known lengths of the baselines constant. The precise geographic coordinates of the transponders $T_i$ are then obtained from the translated transponder network 26 (FIG. 3) and stored in the computer 18 along with the transponder depths $d_i$.

Referring generally to FIG. 1, step two, periodically fixing the geographic position of the ship 12, comprises the steps of (a) periodically interrogating the transponders $T_i$ directly from the ship to determine the acoustic travel times between the ship and the transponders; (b) converting the acoustic travel times between the ship and the transponders to slant ranges (actual distances); (c) computing the horizontal ranges between the ship and the transponders; and (d) fixing the position of the ship at the time of each direct interrogation from the horizontal ranges and the geographic positions of the transponders.

The acoustic command system 19 is preset to initiate direct interrogation of all the transponders $T_i$ at fixed intervals. For example, a one minute time interval between direct interrogation sequences has been very successful with ship speeds up to 10 knots. The round trip acoustic travel times between the ship 12 and the transponders $T_i$ are ascertained by the receiver unit 22 (FIG. 2) and then transferred by the scanner 23 (FIG. 2) to the computer 18 (FIG. 2). There, they are halved an multiplied by the velocity of sound in the water to determine slant ranges, $SR_i$, between the ship 12 and each of the transponders $T_i$ at the time of direct interrogation. The slant ranges $SR_i$ and the previously calculated depths $d_i$ of the transponders $T_i$ are used by the computer 18, in the manner described previously for the baseline lengths $B_{ij}$, to obtain the horizontal ranges, $H_{Si}$, of the ship 12 from the geographic positions of the various transponders at the time of each interrogation.

The computer 18 (FIG. 2) then utilizes the horizontal ranges $H_{Si}$ to fix the geographic coordinates $(x_S, y_S)$ of the ship 12 at the time of direct interrogation. That is, and referring now to FIG. 5, the computer 18 determines the geographic position of the ship 12 that is the best statistical solution to the intersection of arcs having their respective centers at the geographic positions of the transponders and radii equal to the horizontal ranges $H_{Si}$. The computer 18 also controls the operation of a typewriter 28 (FIG. 2) for printing the time of the fix (obtained from the receiver 22, FIG. 2), the accuracy of the fix, and the fix itself in Universal Transverse Mercator (UTM), Northing and Easting coordinates and, if desired, in latitude and longitude.

Referring again to FIG. 1, step three, periodically fixing the three-dimensional position of the remote-powered acoustic interrogation transducer 13 and the towed underwater equipment 11 comprises the steps of (a) periodically command interrogating the RIT 13 from the ship 12 to remote interrogate the transponders $T_i$; (b) determining the acoustic travel times between the ship and the RIT, the RIT and the transponders and the transponders and the ship; (c) predicting the position of the ship at the time of remote interrogation; (d) converting the acoustic travel times between the RIT and the transponders to slant ranges; and (e) spherically solving the geographic position and depth of the RIT from the slant ranges and the positions of the transponders.

The remote interrogation sequences are undertaken periodically, and alternately with the periodic, direct interrogation of the transponders $T_i$. The RIT 13 is activated by the unique acoustic command signal (e.g., of code B or frequency B) originating from the acoustic command system 19 (FIG. 2). Upon activation by the command signal, the RIT 13 broadcasts the normal direct interrogation acoustic signal (code A or frequency A) that is received both at the ship 12 and as a command signal at each of the transponders $T_i$. In response, the transponders $T_i$ broadcast acoustic signals that are received at the ship 12.

The acoustic responses resulting from this remote interrogation sequence are processed by the receiver 22 (FIG. 2) to ascertain the associated travel times. That is, the receiver 22 ascertains the total acoustic travel time between initiation of command interrogation from the ship 12 and the reception at the ship of the response by the RIT 13. The scanner 23 effects the transfer of this total acoustic travel time to the computer 18 (FIG. 2), which halves the total travel time to obtain a one-way acoustic travel time, $t_R$, between the ship and the RIT. The time $t_R$ also represents the exact time of initiation of remote interrogation by the RIT 13. Additionally, the receiver 22 ascertains the total acoustic travel times between initiation of command interrogation from the ship 12 and the reception at the ship of the responses of the transponders $T_i$. The time $t_R$ is subtracted from these total acoustic travel times by the computer 18 to obtain the acoustic travel times, $t_i$, between initiation of remote interrogation by the RIT 13 and the receipt at the ship 12 of the response signals from each of the transponders $T_i$. The travel times $t_i$ and $t_R$ are then stored in the computer 18.

The geographic position of the ship 12 at the time at which remote interrogation is initiated by the RIT 13, $t_R$, may be predicted by the computer 18 (FIG. 2) by extrapolation from past fixes of the ship's position. Since this predicted position information is required in several of the subsequent computations, preferably it is determined immediately upon establishing the time $t_R$.

Referring further to FIG. 1, the acoustic travel times $t_i$ (between the initiation of remote interrogation by the RIT 13 and the reception at the ship 12 of the responses of the transponders $T_i$) may be written as:

$t_i = t_{Ri} + t_{iS}$, where $t_{Ri}$ is the acoustic travel time between the RIT 13 and transponder $T_i$, and $t_{iS}$ is the acoustic travel time between the transponder $T_i$ and the ship 12.

The computer 18 (FIG. 2) is programmed to predict the acoustic travel time $t_{iS}$ between each of the transponders $T_i$ and the ship 12 using the exact time of remote interrogation, the predicted position of the ship at that time, and the positions of the transponders. This predicted travel time $t_{iS}$ is then deducted from the acoustic travel time $t_i$ to give the acoustic travel time between the RIT 13 and the transponder $T_i$:

$t_{Ri} = t_i - t_{iS}$ (predicted).

The computer 18 next computes the slant ranges $S_{Ri}$ from the RIT 13 to each of the transponders $T_i$ at the time of remote interrogation from the equation:

$S_{Ri} = v_{Ri} \times t_{Ri}$, where $v_{Ri}$ is the average sound velocity from the RIT 13 to the transponder $T_i$. $V_{Ri}$ may be determined from profiles of sound velocity in the water.

Referring still further to FIG. 1, the computer 18 (FIG. 2) now utilizes the positions $(x_i, y_i, d_i)$ of the transponders $T_i$ and the slant ranges $SR_i$ to spherically solve the geographic position and depth of the RIT 13. This is done from the general equation:

$S_{Ri}^2 = (x_i - x_R)^2 + (y_i - y_R)^2 + (d_i - d_R)^2$, or $S_{Ri}^2 = x_i^2 + y_i^2 + d_i^2 - 2x_i x_R - 2y_i y_R - 2d_i d_R + x_R^2 + y_R^2 + d_R^2$, where $(x_R, y_R, d_R)$ are the unknown geographic coordinates and depth of the RIT 13. One such equation is derived for each of the three transponders $T_i$. The three equations are then solved simultaneously to obtain $x_R$, $y_R$, and $d_R$. Since the RIT 13 and the towed equipment 11 are proximate physically, both the depth $d_R$ and the geographic coordinates $(x_R, y_R)$ of the RIT apply to the towed equipment.

Referring to FIG. 2, after computing the three-dimension coordinates $(x_R, y_R, d_R)$ of the RIT 13 (FIG. 1), the computer 18 actuates the computer typewriter 28 for recording the geographic coordinates of the ship 12 and the three-dimensional coordinates of the RIT 13 at the time of remote interrogation, and may be used to control a range display 29 and an X-Y plotter 31 for, respectively, displaying and charting the UTM and geographic coordinates of the ship and the RIT. If desired, the range display 29 and the X-Y plotter 31 may also be used, respectively, to display and to chart the three-dimensional coordinates of the transponders $T_i$ and the geographic and UTM coordinates of the ship 12 obtained pursuant to steps one and two, respectively.

Figure 6:
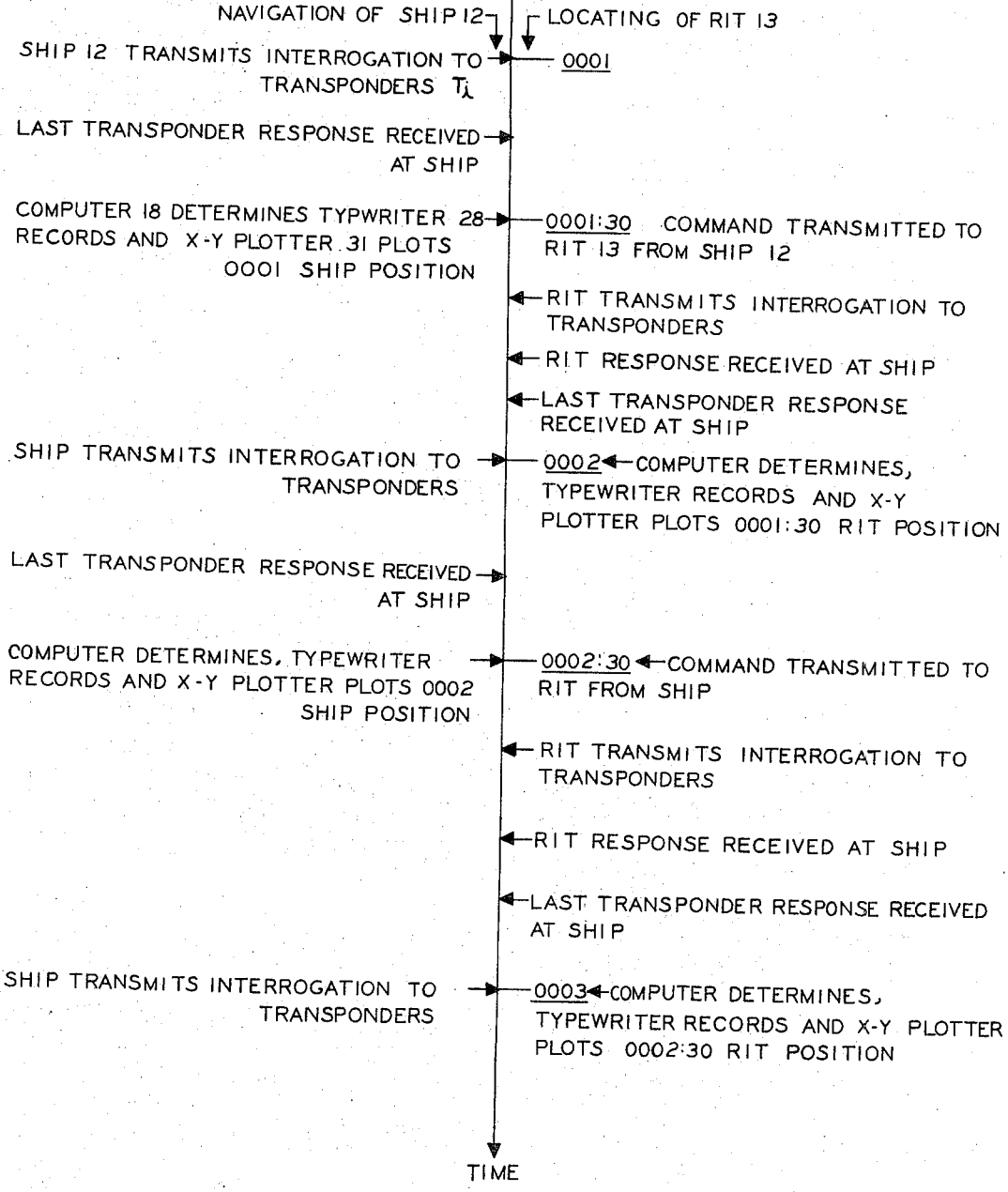
FIGS. 6 and 7 are time charts of the sequence of operations used in practicing the invention with, respectively, networks of single and double transponders.

A time chart of the synchronization between the direct and the remote interrogation sequences is shown in FIG. 6. Direct interrogation is undertaken every minute on the minute to obtain navigational fixes of the position of the ship 12 and remote command interrogation is undertaken every minute on the half minute to obtain three-dimensional fixes for the RIT 13 and the towed equipment 11. Considering this synchronization based upon any convenient reference time after the initiation of the monitoring process, for example, at minute 1:00, the acoustic command system 19 (FIG. 2) initiates direct inerrogation of the transponders $T_1$-$T_3$. The transponders reply to the ship 12 at their unique frequencies. The travel times associated with the transponders $T_1$-$T_3$ are applied as input to and used by the computer 18 to determine the geographic position of the ship 12 at the minute 1:00 and to control the computer typewriter 28 and the X-Y plotter 31 to record the position information. This sequence, which is reinitiated every minute on the minute, is completed by the time the remote interrogation sequence is initiated every minute on the half minute.

At minute 1:30, and at one minute intervals, the acoustic command system 19 (FIG. 2) command interrogates the RIT 13. The RIT 13 replies to the ship 12 and remote interrogates the transponders $T_1$-$T_3$. The responses from the RIT 13 and the Transponders $T_1$-$T_3$ are received at the ship 12 before the next direct interrogation at minute 2:00. The acoustic travel times between initiation of command interrogation from the ship 12 and the reception at the ship of the responses of the RIT 13 and the transponders $T_1$-$T_3$ are determined and displayed by the receiver 22. This travel time information is then applied by the computer 18 to compute other requisite time information, including the time of remote interrogation, $t_R$.

Assuming that the monitoring process was initiated sufficiently in advance of our arbitrary reference point, minute 1:00, several transponder network fixes of the position of the ship 12 will have been established from previous direct interrogations. The computer 18 now uses these previous fixes to extrapolate the exact position of the ship 12 at the time of the remote interrogation, $t_R$, that is initiated by the minute 1:30 command interrogation. Also, as described previously, the computer 18 utilizes the extrapolated position of the ship in conjunction with the remote interrogation travel times to determine the position of the RIT 13 and the towed equipment 11 at the time of remote interrogation, $t_R$. To ensure sufficient time for compilation and print out, approximately a one-half minute interval is allotted between initiation of a remote interrogation sequence and the recording by the computer typewriter 28 and the plotting by the X-Y plotter 31 of the position of the RIT 13. Thus, the position of the RIT 13 for the remote interrogation sequences initiated at minutes 1:30, 2:30, etc., are recorded by the computer typewriter 28 and plotted by the X-Y plotter 31 approximately thirty seconds after each remote interrogation, that is, at about minutes 2:00, 3:00, etc.

The position of the RIT 13 may be determined with even greater accuracy by programming the computer 18 to interpolate the position of the ship 12 between the fixes of the ship's position immediately before and after each remote interrogation. For example, the fixes of the ship's position at minutes 1:00 and 2:00 may be interpolated to determine the ship's position at the 1:30 remote interrogation sequence. Obviously, the interpolation cannot be made until the later position, that for minute 2:00 in the example, is determined. Consequently, the use of interpolation requires a longer elapsed time between remote interrogation and the print out of the RIT 13 position than is required using extrapolation.

By monitoring the position of the RIT 13 and the ship 12 according to the above-described, synchronized method, the heading and/or speed of the ship 12 and the depth of the RIT 13 and the equipment 11 (FIG. 1) may be altered so that the equipment is towed to or past a given geographic location at a given depth. However, for certain applications, such as guiding the towed equipment 11 to a bottom site, it may be desirable to decrease the time intervals between the fixes of the position of RIT 13. Referring now to FIG. 1, by using a pair of remote and direct transponders $R_i$ and $T_i$, respectively, at each transponder mounting site and by increasing the number of channels in the acoustic command system 19 (FIG. 2) and the receiver 22 (FIG. 2) accordingly, the fix intervals may be halved.

Figure 7:
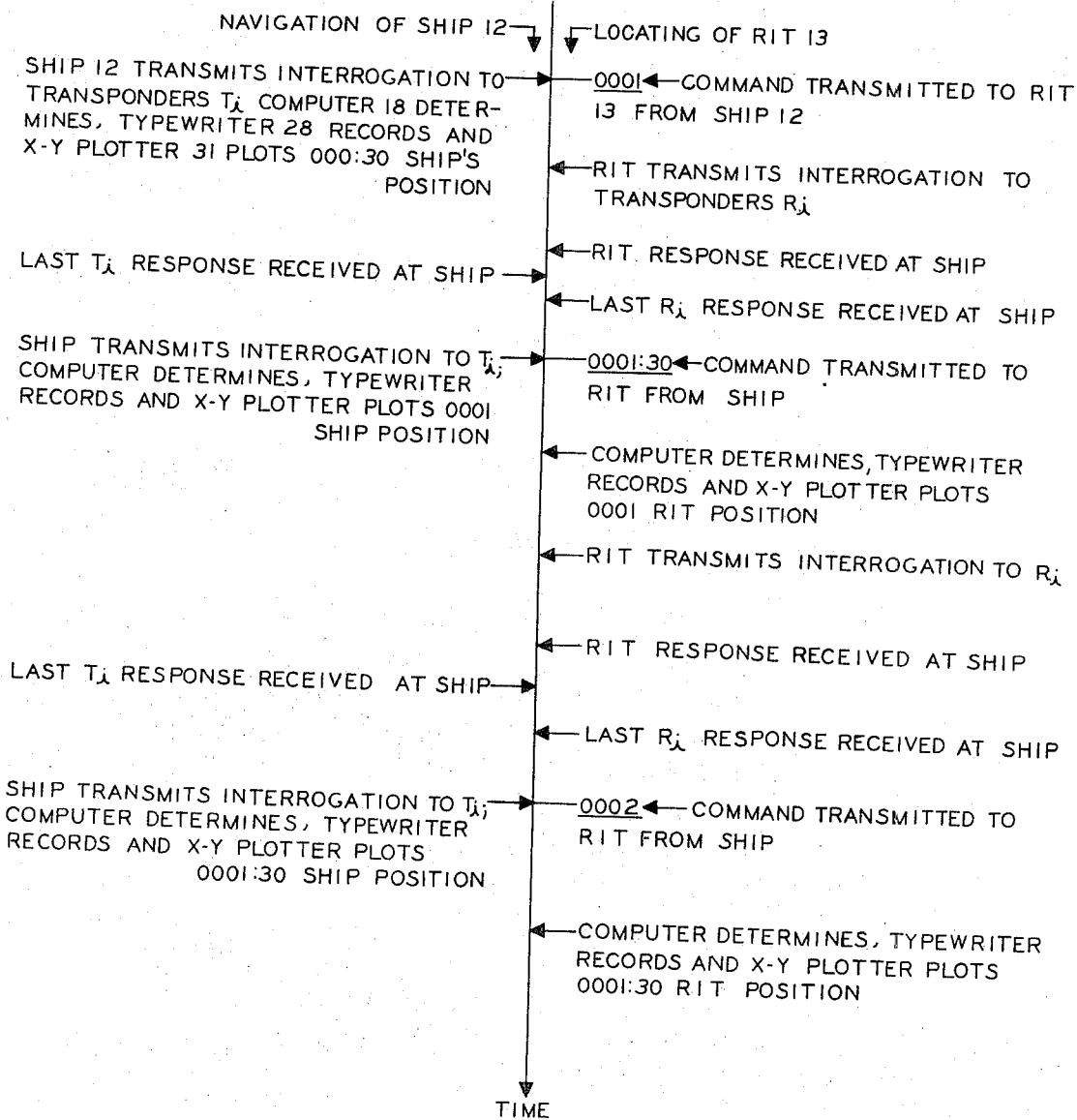

Referring now to FIG. 7, the direct and remote interrogation sequences may now be undertaken simultaneously, for example, at one-half minute intervals. That is, the RIT 13 and the direct interrogation transponders $T_1$–$T_3$ are interrogated directly from the ship 12 at the reference minute 1:00 (transponders $R_1$–$R_3$ are not interrogated by the signal); the RIT then remote interrogates the remote interrogation transponders $R_1$–$R_3$ using a signal that doesn't interrogate transponders $T_1$–$T_3$. The acoustic travel times derived from the direct interrogation sequence are utilized by the computer 18, as described previously for the network 14 of single transponders, to compute, and control the typewriter 28 for recording and the X-Y plotter 31 for plotting, the minute 1:00 (1:30, 2:00, etc.) position of the ship 12 at approximately the minute 1:30 (2:00, 2:30, etc.). The acoustic travel times derived from the remote interrogation sequence are utilized in conjunction with the interpolated position of the ship 12 at the time of remote interrogation to compute and record the remote interrogation position of the RIT 13 within approximately thirty seconds after each remote interrogation. Determination of the 0001 RIT position shown in FIG. 7 assumes the monitoring process was initiated at least 30 seconds prior to the arbitrary reference point, minute 1:00, in order to provide the position of the ship at minute 0:30 for use in interpolating the ship's position at the 1:00 remote interrogation sequence.

Figure 8:
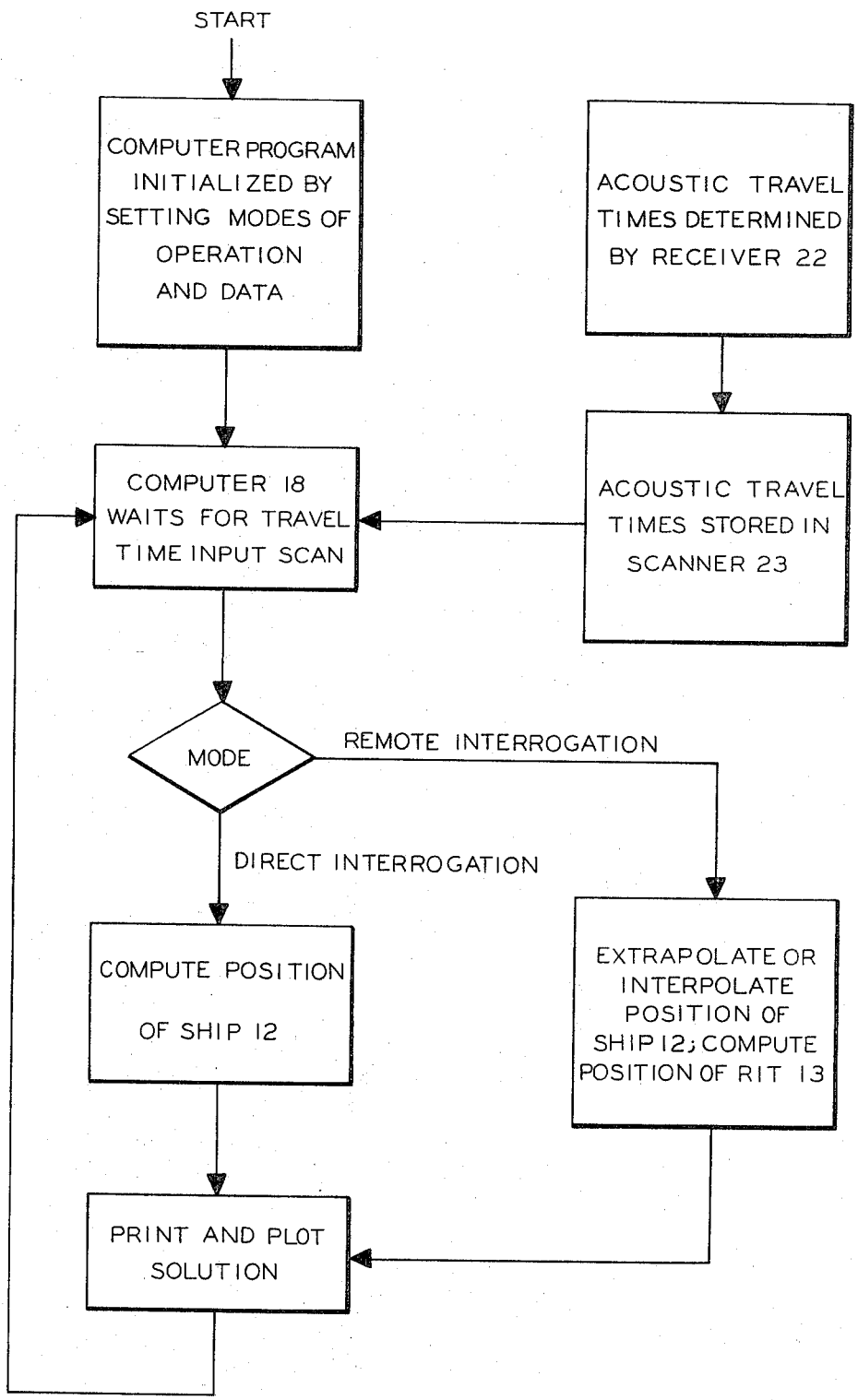
FIG. 8 is a flow chart of computer-related activity that is employed in practicing the invention.

Shown in FIG. 8 is a simplified flow chart of computer activity during steps two and three of a monitoring operation. (Step one is a straightforward application of travel time and satellite fix data by the computer 18 to determine the positions of the transponders $T_i$.) First, the computer program is initialized by selecting the desired modes of operation and by storing necessary data. The possible modes include interpolation or extrapolation of the position of the ship 12 (FIG. 1); requisite data include profiles of sound velocity as a function of water depth and the three-dimensional positions of the transponders $T_i$ derived from step one.

During steps two and three of a monitoring operation, the computer 18 distinguishes direct from remote interrogation travel time data and selects the appropriate mode of operation. Thus, upon receiving direct interrogation travel times, the computer 18 computes the position of the ship 12 (FIG. 1) at the time of direct interrogation according to step two. Upon receiving remote interrogation travel times, the computer 18 proceeds according to step three to compute both the acoustic travel times between the various apparatus and also the exact time of remote interrogation, $t_R$; to extrapolate the position of the ship 12; and to compute the position of the RIT 13 (FIG. 1) at the time of remote interrogation.

Referring to FIG. 2, the RIT 13 used in the present invention comprises essentially a hydrophone for receiving the command interrogation signals from the transducer 21 and a transceiver tuned to these command signals and interfaced with a transmitting transducer for broadcasting an acoustic response that is received by the transducer 21 and is at the actuation frequency of the transponders $T_i$.

The RIT 13 may be replaced by a simple acoustic beacon, a pinger that continually emits pulses that both interrogate the transponders $T_i$ and also are received by the transducer 21. One suitable, commercially available beacon is the Model 360 Acoustic Beacon, manufactured by the AMF Corporation of Alexandria, Virginia.

The use of an acoustic beacon is feasible where decreased accuracy due to possible drift in the pulse rate and the loss of flexibility in the inability of the beacon to be command interrogated are acceptable. An acoustic beacon necessitates the use of a clock in the receiver and display unit 22 that is synchronized with the beacon pulse rate in order to "zero" the travel time counters used in the receiver. The cycles of the travel time counters are thus initiated at the exact time of initiation of pulses by the beacon (any drift in the pulse rate of the beacon is ignored), permitting accurate computation of the acoustic travel times between the beacon and the ship (FIG. 1) and the transponders $T_i$ and the ship. The acoustic travel times between the transponders $T_i$ and the ship 12 or between both the beacon and the ship and the transponders and the ship are then utilized, respectively, in the manner previously described for the direct interrogation and the remote interrogation sequences.

Referring further to FIG. 2, the computer 18 used in the present invention is a Bunker-Ramo Model 133 Computer, manufactured by the Bunker-Ramo Corporation, Canoga Park, California. The acoustic locating system 10 is amenable to the use of other computers that are capable of concurrently handling input from the satellite navigation system 27 and travel time information from the scanner 23.

Referring still further to FIG. 2, the transponders $T_i$, the acoustic command system 19 and the receiver and display unit 22 used in the present invention are, respectively, Model 324 Transponders, the Model 200 Acoustic Command System, and the Model 205 Receiver, all manufactured by the AMF Corporation of Alexandria, Virginia. However, other commercially available acoustic transponder apparatus, including the corresponding components of the Model 474 Transponder Navigation System, manufactured by the EDO Western Corporation of Salt Lake City, Utah, may be utilized.

Finally, the satellite navigation system 27 used in the present invention is a Model 702-HP Satellite Navigation System, manufactured by the Magnavox Corporation of Torrance, California, or a similar system suitable for processing signals from the Navy Satellite System and thereby obtaining fixes of the position of the ship 12 (FIG. 1).

What is claimed is:

1. A method of monitoring the three-dimensional position of equipment towed underwater from a ship geographically positioned within the approximate geographic area bounded by an underwater network of at least three acoustic transponders of known geographic position and depth, the method comprising the steps of:

interrogating the transponders directly from the ship to determine acoustic travel times between the ship and the transponders;

fixing the geographic position of the ship relative to the transponders at the time of direct interrogation from the depths of the transponders and the direct interrogation acoustic travel times;

interrogating a remote-powered acoustic interrogation transducer associated with the towed equipment to determine acoustic travel times between the ship and the towed equipment and to interrogate each of the transponders by the interrogation transducer to determine acoustic travel times from the ship to the towed equipment to each of the transponders and back to the ship; and fixing the three-dimensional position of the towed equipment relative to the ship from the geographic position of the ship, the depth of the transponders and the acoustic travel times between the ship and the towed equipment and the acoustic travel times from the ship to the towed equipment to each of the transponders and back to the ship.

2. The method of claim 1, wherein fixing the geographic position of the ship at the time of direct interrogation comprises the steps of:

converting the direct interrogation acoustic travel times between the ship and the transponders to slant ranges;

computing a horizontal range between the ship and the transponders from the slant ranges and the depth of the transponders; and converting the horizontal ranges to the geographic position of the ship relative to the geographic positions of the transponders.

3. The method of claim 1, wherein fixing the three-dimensional position of the towed equipment at the time of remote interrogation comprises the steps of:

predicting a position of the ship at the time of remote interrogation from the geographic position of the ship at the time of the direct interrogation;

determining a one way acoustic travel time ($t_R$) between the ship and the remote interrogation transducer and therefore the towed equipment associated therewith;

predicting the acoustic travel time ($t_{iS}$) from each of the transponders to the ship from the predicted geographic position of the ship and the position of the transponders;

determining an acoustic travel time ($t_{Ri}$) between the remote interrogation transducer and each transponder by subtracting the acoustic travel time ($t_R$) and the predicted acoustic travel time ($t_{iS}$) for each of the transponders from the total acoustic travel times from the ship to the remote interrogation transducer to each of the transponders and back to the ship;

determining slant ranges ($S_{Ri}$) from the remote interrogation transducer to each transponder from the acoustic travel times ($t_{Ri}$); and determining the three-dimensional position of the towed equipment from the slant ranges ($S_{Ri}$) the depth of the transponders and the geographic position of the transponders.

4. A method of monitoring the three-dimensional position of underwater equipment towed by a ship, comprising:

bottom mounting at least three transponders to bound a predetermined geographic area;

steaming across each transponder while interrogating the transponders to determine a minimum acoustic travel time from the ship to each transponder;

converting the minimum acoustic travel times to a depth for each transponder;

steaming at right angles to a line joining a pair of transponders while interrogating the transponders to determine the minimum acoustic travel times between the ship and the transponders;

repeating the foregoing step for each pair of transponders;

converting the minimum acoustic travel times between the ship and each transponder of each pair of transponders to a horizontal range between each pair of transponders;

fixing a geographic position of the transponders relative to a position of the ship from the depth of and horizontal ranges between the transponders;

interrogating the transponders directly from the ship to determine acoustic travel times between the ship and each transponder;

fixing a geographic position of the ship relative to the transponders at the time of direct interrogation from the depths and geographic position of the transponders and the direct interrogation acoustic travel times;

interrogating a remote-powered acoustic interrogation transducer associated with the towed equipment to determine acoustic travel times between the ship and the towed equipment and to interrogate each of the transponders by the interrogation transducer to determine acoustic travel times from the ship to the towed equipment to each of the transponders and back to the ship; and fixing the three-dimensional position of the towed equipment relative to the ship from the geographic position of the ship, the depth of the transponders and the acoustic travel times between the ship and the towed equipment and the acoustic travel times from the ship to the towed equipment to each of the transponders and back to the ship.

* * * * *